(12) United States Patent
Avakian et al.

(10) Patent No.: US 9,732,218 B2
(45) Date of Patent: Aug. 15, 2017

(54) NON-HALOGENATED FLAME RETARDANT POLYCARBONATE COMPOUNDS

(75) Inventors: Roger W. Avakian, Solon, OH (US); Ling Hu, Westlake, OH (US)

(73) Assignee: PolyOne Corporation, Avon Lake, OH (US)

( * ) Notice: Subject to any disclaimer, the term of this patent is extended or adjusted under 35 U.S.C. 154(b) by 77 days.

(21) Appl. No.: 14/232,587

(22) PCT Filed: Jul. 12, 2012

(86) PCT No.: PCT/US2012/046520
§ 371 (c)(1),
(2), (4) Date: Jan. 13, 2014

(87) PCT Pub. No.: WO2013/010012
PCT Pub. Date: Jan. 17, 2013

(65) Prior Publication Data
US 2014/0163137 A1    Jun. 12, 2014

Related U.S. Application Data

(60) Provisional application No. 61/511,344, filed on Jul. 25, 2011, provisional application No. 61/508,020, filed on Jul. 14, 2011.

(51) Int. Cl.
*C08L 69/00* (2006.01)
*C09K 21/12* (2006.01)
*C08K 5/5399* (2006.01)
*C08K 3/34* (2006.01)

(52) U.S. Cl.
CPC ............ *C08L 69/00* (2013.01); *C09K 21/12* (2013.01); *C08K 3/34* (2013.01); *C08K 5/5399* (2013.01)

(58) Field of Classification Search
CPC ......... C08L 69/00; C08L 27/18; C09K 21/12; C08K 5/5399; C08K 3/34
See application file for complete search history.

(56) References Cited

U.S. PATENT DOCUMENTS

| | | |
|---|---|---|
| 5,952,408 A | 9/1999 | Lee et al. |
| 6,518,336 B1 | 2/2003 | Yabuhara et al. |
| 6,596,893 B2 | 7/2003 | Nakacho et al. |
| 6,743,841 B2 | 6/2004 | Shimizu et al. |
| 6,939,905 B2 | 9/2005 | Seidel et al. |
| 6,946,578 B2 | 9/2005 | Nakano et al. |
| 7,094,818 B2 | 8/2006 | Lim et al. |
| 7,446,144 B2 | 11/2008 | Wenz et al. |
| 7,449,506 B2 | 11/2008 | Sato |
| 7,985,788 B2 | 7/2011 | Shinagawa et al. |
| 8,026,303 B2 | 9/2011 | Levchik et al. |
| 8,779,037 B2 | 7/2014 | Son et al. |
| 2003/0092805 A1 | 5/2003 | Seidel et al. |
| 2005/0245670 A1 | 11/2005 | Sato |
| 2008/0153959 A1 | 6/2008 | Charati et al. |
| 2009/0088514 A1 | 4/2009 | Shiping |
| 2011/0052895 A1* | 3/2011 | Li ......................... C08L 69/00 428/220 |
| 2015/0166787 A1 | 6/2015 | Avakian et al. |

FOREIGN PATENT DOCUMENTS

| | | |
|---|---|---|
| CN | 102337034 A | 2/2012 |
| EP | 1 104 766 B1 | 5/2004 |
| JP | 2000351893 A | 12/2000 |
| JP | 2001002908 A | 1/2001 |
| JP | 2002302597 A | 10/2002 |
| WO | 0181470 A1 | 11/2001 |

OTHER PUBLICATIONS

Wacker "Silicones- compounds and properties", published on Apr. 2012.*

* cited by examiner

*Primary Examiner* — Gregory Listvoyb
(74) *Attorney, Agent, or Firm* — Michael J. Sambrook; John H. Hornickel

(57) ABSTRACT

A flame retardant polycarbonate compound is disclosed. The compound comprises a polycarbonate and non-halogenated polyphosphazene as a flame retardant, along with talc, polytetrafluoroethylene, and optionally, a potassium salt of perfluorobutane sulfonic acid. The compound can achieve a UL 94 rating of V-0 at two different thicknesses of less than 1 mm.

13 Claims, No Drawings

NON-HALOGENATED FLAME RETARDANT POLYCARBONATE COMPOUNDS

CLAIMS OF PRIORITY

This application claims priority from U.S. Provisional Patent Application Ser. No. 61/508,020 filed on Jul. 14, 2011 and from U.S. Provisional Patent Application Ser. No. 61/511,344 filed on Jul. 25, 2011, both of which are incorporated by reference.

FIELD OF THE INVENTION

This invention concerns thermoplastic polymer compounds which are flame retardant using non-halogenated ingredients.

BACKGROUND OF THE INVENTION

Thermoplastic compounds, unlike wood, metal, or glass, do not rot, rust, or shatter. For that reason, the world in the past seventy years has seen a revolution in material science arising from the combination of a thermoplastic resin and one or more functional additives to provide specific properties to the resin.

Unlike wood but like metal and glass, at a given temperature, a thermoplastic resin can melt. Its processing versatility benefits from its capacity to mix with the functional additives while in a molten state.

But in use, the exposure of a fully formed thermoplastic article to excessive heat or flame can be quite detrimental to property and person.

Flame retardants, drip suppressants, mineral fillers, and char formers are functional additives which can be used to help the thermoplastic compound to retard the effects of heat or flame from melting or even burning. Flame retardant thermoplastic compounds are particular needed when the plastic article is used in any confined space where persons might be present during any condition, planned or emergency, which might expose the plastic article to such excessive heat or flame.

Non-halogenated flame retardants have recently become popular because they minimize the release of halogenated chemicals if the plastic article would begin to degrade, melt, or burn.

SUMMARY OF THE INVENTION

What the art needs is a non-halogenated thermoplastic compound capable of passing the Underwriters' Laboratories Test No. 94 (UL 94 test) by achieving a V-0 rating.

Even with the variety of functional additives commercially available, it is not a predictable pathway for a person having ordinary skill in the art to find a particular combination of ingredients which, together, can achieve a V-0 rating in a UL 94 test.

The present invention has found a particular combination of known ingredients which, together, achieve a V-0 rating in a UL 94 test, at thicknesses ranging from about 0.4 mm to 0.7 mm, less than the thickness of one American dime ($0.10) coin, a task very difficult and unpredictable to achieve.

Starting with polycarbonate as the thermoplastic resin chosen for its physical properties, a non-halogenated flame retardant is combined with other functional ingredients to achieve that coveted V-0 rating.

One aspect of the present invention is a flame retardant polycarbonate compound, comprising polycarbonate, polyphosphazene, talc, and polytetrafluoroethylene, wherein the polyphosphazene is present in the compound at a weight percent from 5 to about 15, and wherein the compound tested at a thickness of 0.75 mm and a thickness of 0.4-0.5 mm has a UL 94 rating of V-0.

Features of the invention will be explored below.

EMBODIMENTS OF THE INVENTION

Polycarbonate

Any polycarbonate is a candidate for use in the compound, whether obtained from petrochemical or bio-derived sources, whether virginal or recycled.

Polycarbonates can be branched or unbranched, with the former being preferred in this invention. Polycarbonates can be aliphatic or aromatic, with the latter being preferred in this invention. Without undue experimentation, one of ordinary skill in the art can select a polycarbonate matrix based on considerations of cost, manufacturing technique, physical properties, chemical properties, etc.

Commercial manufacturers of polycarbonate are Sabic, Bayer, Teijin, Dow, and others.

Non-Halogenated Polyphosphazene

Polyphosphazenes as candidates for use in this invention contain no halogen atoms, which characterizes them as non-halogenated. Two reasons for using non-halogenated polyphosphazenes as compared with other non-halogenated phosphorus-containing flame retardants are that the phosphazenes have very good hydrolytic stability and efficient flame retardancy at low loadings. Phosphazenes can also reduce or minimize plasticization effects which can cause a significant decrease in heat deflection temperature (HDT) of the overall compound.

U.S. Pat. No. 6,518,336 (Yabuhara et al.) and U.S. Pat. No. 6,743,841 (Shimizu et al.), both of which are incorporated by reference herein, disclose non-halogenated polyphosphazenes which are candidates for use in this invention. Briefly, U.S. Pat. No. 6,518,336 discloses four types of polyphosphazenes.

(1) Cyclic polyphosphazenes represented by the Formula (1)

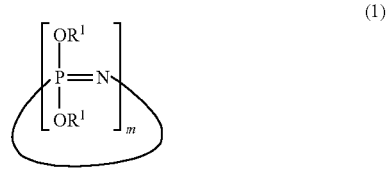

wherein m is an integer of 3 to 25, two $R^1$ groups are the same or different and each represents a phenyl group substituted with at least one group selected from the class consisting of alkyl groups having 1 to 6 carbon atoms and an allyl group or an unsubstituted phenyl group.

(2) Straight-chain polyphosphazenes represented by the Formula (2)

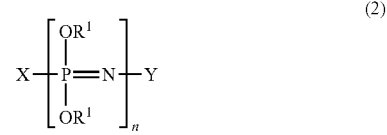

wherein n is an integer of 3 to 1000, $R^1$ is as defined above, X represents a group —N=P($OR^1$)$_3$ or a group —N=P(O)$OR^1$, and Y represents a group —P($OR^1$)$_4$ or a group —P(O)($OR^1$)$_2$.

(3) Crosslinked polyphosphazenes wherein at least one of the foregoing phosphazenes (1) and (2) is crosslinked with at least one crosslinking group selected from the group consisting of o-phenylene, m-phenylene, p-phenylene, biphenylene, and a group represented by

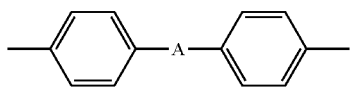

wherein A is a group —SO$_2$—, a group —S—, a group —O— or a group —C(CH$_3$)$_2$—, each of said crosslinking groups being interposed between the two oxygen atoms left after the elimination of group $R^1$ from the phosphazene (1) or (2), and the number of the $R^1$ groups in the crosslinked phosphazene being 50 to 99.9% based on the total number of $R^1$ groups in the phosphazene prior to the crosslinking.

(4) At least one polyphosphazene selected from the group consisting of cyclic polyphosphazenes represented by formula (3)

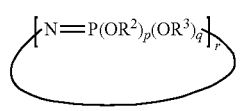

wherein $R^2$ is a cyano-substituted phenyl group; $R^3$ is an alkyl group having 1 to 18 carbon atoms or an aryl group having 6 to 10 carbon atoms; these groups may be substituted with at least one group selected from alkyl groups having 1 to 10 carbon atoms, allyl group and aryl groups; when two or more $R^3$ groups exist, the $R^3$ groups may be the same or different; p and q are numbers which fulfill the requirements that p>0, q. 0, and p+q=2; and r is an integer of 3 to 25, and a straight-chain polyphosphazene represented by the formula (4)

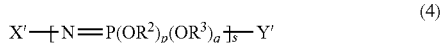

wherein $R^2$, $R^3$, p and q are as defined above; s is an integer of 3 to 1000; X' is a group —P(OR)4 a group —P($OR^2$)$_3$($OR^3$), a group —P($OR^2$)$_2$($OR^3$)$_2$, a group —P($OR^2$)($OR^3$)$_3$, a group —P($OR^3$)$_4$, a group —P(O)($OR^2$)$_2$, a group —P(O)($OR^2$)($OR^3$), or a group —P(O)($OR^3$)$_2$; and Y' is a group —N=P($OR^2$)$_3$, a group —N=P($OR^2$)$_2$($OR^3$), a group —N=P($OR^2$)($OR^3$)$_2$, a group —N=P($OR^3$)$_3$, a group —N=P(O)$OR^2$ or a group —N=P(O)$OR^3$.

The foregoing examples of the non-halogenated polyphosphazenes can be used either alone or in combination.

Specific examples of the cyclic polyphosphazene (1) and the straight-chain polyphosphazene (2) include a mixture of phosphazenes in which phenoxy groups and/or alkoxy groups are introduced as substituents and which are obtainable from a mixture of cyclic and straight-chain chlorophosphazenes, e.g., hexachlorocyclotriphosphazene, octachlorocyclotetra-phosphazene and the like, prepared by reacting ammonium chloride and phosphorus pentachloride at about 120 to about 130° C.; and hexaphenoxycyclotriphosphazene, octaphenoxycyclotetraphosphazene, decaphenoxycyclo-pentaphosphazene, hexaalkoxycyclotriphosphazene, octaalkoxycyclotetraphosphazene, decaalkoxycyclopentaphosphazene and like cyclic phosphazenes obtained by isolating, from the above mixture of chlorophosphazenes, hexachlorocyclotriphosphazene, octachlorocyclotetraphosphazene, decachlorocyclopenta-phosphazene or like single substances, followed by substitution with a phenoxy group and/or an alkoxy group.

Specific examples of the straight-chain polyphosphazenes (2) include those obtained by heating (at 220 to 250° C.) hexachlorocyclotriphosphazene for ring-opening polymerization to give dichlorophosphazene, followed by substitution with a phenoxy group and/or an alkoxy group.

Specific examples of the crosslinked polyphosphazenes (3) are phenoxyphosphazene having 4,4'-sulfonyldiphenylene(bisphenol-S residue) group-crosslinked structure, phenoxyphosphazene having 2,2-(4,4'-diphenylene)isopropylidene group-crosslinked structure, phenoxyphosphazene having 4,4'-oxydiphenylene group-crosslinked structure, phenoxyphoshazene having 4,4'-thiodiphenylene group-crosslinked structure, phenoxyphosphazene having 4,4'-diphenylene group-crosslinked structure, etc.

Specific examples of the polyphosphazenes (4) are monocyanophenoxypentaphenoxycyclotriphosphazene, dicyanophenoxytetraphenoxycyclotriphosphazene, tricyanophenoxytriphenoxycyclotriphosphazene, tetracyanophenoxydiphenoxycyclotriphosphazene, pentacyanophenoxymonophenoxycyclotriphosphazene and like cyclotriphosphazene compounds; monocyanophenoxyhepta-phenoxycyclotetraphosphazene, dicyanophenoxyhexaphenoxycyclotetraphosphazene, tricyanophenoxypentaphenoxy-cyclotetraphosphazene, tetracyanophenoxytetraphenoxy-cyclotetraphosphazene, pentacyanophenoxytriphenoxycyclotetraphosphazene, hexacyanophenoxydiphenoxy-cyclotetraphosphazene, heptacyanophenoxymonophenoxy-cyclotetraphosphazene and like cyclotetraphosphazenes; cyclopentaphosphazenes having both cyanophenoxy and phenoxy groups as substituents; and like cyclic phosphazenes; and straight-chain phosphazenes having both cyanophenoxy and phenoxy groups as substituents.

Among these polymers, preferred are a mixture of polyphenoxyphosphazenes which have phenoxy groups as substituents and which are obtainable from a mixture of cyclic and straight-chain chlorophosphazenes, phenoxyphosphazene having 4,4'-sulfonyldiphenylene-crosslinked structure; phenoxyphosphazene having 2,2-(4,4'-diphenylene)-isopropylidene group-crosslinked structure; and polyphosphazenes having both cyanophenoxy and phenoxy groups as substituents.

Commercially available polyphosphazenes can be purchased from Otsuka Chemical Co., Ltd. of Osaka, Japan. Presently preferred is SPB 100 polyphosphazene from Otsuka.

Talc

Talc is used in thermoplastic compounds as a mineral filler. In flame retardant thermoplastic compounds, talc can assist in flame retardance by being a barrier to oxygen and increasing viscosity of the molten polymer matrix during combustion.

Talc can have a particle size ranging about 0.5 μm to about 10 μm and preferably from about 0.5 μm to about 0.9 μm.

Talc is commercially available from a number of manufacturers. Presently preferred is Ultra Talc 609 from Specialty Minerals company, which has a particle size of from about 0.5 μm to about 0.9 μm.

PTFE

Polytetrafluoroethylene is known to be useful as a drip suppressant because it tends fibrillate and elongate during injection molding. Fibrils shrink upon exposure to heat from a flame and hence retard dripping of the matrix in which the fibrils reside.

PTFE can have a particle size ranging from about 5 μm to about 25 μm with the possibility of aggregation and agglomeration.

PTFE is commercially available from a number of manufacturers, but the best known is DuPont which invented the polymer. Presently preferred is Teflon™ PFTE 6C from DuPont, which has an average particle size of the agglomerate of about 480 μm.

Optional Char Former

Flame retardant thermoplastic compounds can benefit from the presence of char formers, chemicals which assist in the retention of the original shape of the plastic article by the formation of char from the compound.

One known char former is perfluorobutane sulfonic acid, potassium salt, which is sold as neat powder or as pellets of a masterbatch, with the latter being preferred for processing efficiency. The char former is considered optional for use in the compound of this invention because, as the Examples demonstrated, the compound does not need this particular functional additive to achieve a UL 94 V-0 rating. But one example did demonstrate that the presence of this char former can achieve a UL 94 V-0 rating at both 0.7 mm thickness and 0.4-0.5 mm thickness, when using the masterbatch pellets.

Perfluorobutane sulfonic acid, potassium salt is commercially available as Bayowet C4 MB masterbatch (6% salt (CAS No. 029420-49-3) in polycarbonate pellets) or Bayowet C4 powder (CAS No. 029420-49-3) from Lanxess Deutschland GmbH.

Optional Other Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; smoke suppresants; impact modifiers; initiators; lubricants; micas; pigments, colorants and dyes; plasticizers, such as core/shell impact modifiers; processing aids; release agents; silanes, titanates and zirconates; slip and anti-blocking agents; stabilizers; stearates; ultraviolet light absorbers; viscosity regulators; waxes; catalyst deactivators, and combinations of them.

Ingredients

Table 1 shows the acceptable, desirable, and preferred amounts of each of the ingredients discussed above, recognizing that the optional ingredients need not be present at all. The compound can comprise the ingredients, consist essentially of the ingredients, or consist of the ingredients. All amounts are expressed in weight percent of the total compound.

All ingredients other than the polycarbonate matrix can be added individually to the matrix or any two or more of them can be added together.

TABLE 1

| Range of Ingredients (Weight Percent) | | | |
|---|---|---|---|
| | Acceptable | Desirable | Preferable |
| Polycarbonate Matrix | 80-90 | 80-90 | 80-85 |
| Polyphosphazene | 5-15 | 5-10 | 7-10 |
| Talc | 2-9 | 3-8 | 4-6 |
| Polytetrafluoroethylene | 0.1-0.8 | 0.3-0.7 | 0.4-0.6 |
| Potassium salt of perfluorobutane sulfonic acid | 0-0.2 | 0-0.1 | 0-0.01 |
| Optional Other Additives | 0-5 | 0-3 | 0-2 |

Processing

The preparation of compounds of the present invention is uncomplicated. The compound of the present can be made in batch or continuous operations.

Mixing in a continuous process typically occurs in a single or twin screw extruder that is elevated to a temperature that is sufficient to melt the polymer matrix with addition of other ingredients either at the head of the extruder or downstream in the extruder. Extruder speeds can range from about 50 to about 500 revolutions per minute (rpm), and preferably from about 350 to about 450 rpm. Typically, the output from the extruder is pelletized for later extrusion or molding into polymeric articles.

Mixing in a batch process typically occurs in a Banbury mixer that is capable of operating at a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

Thermoplastic compounds can be shaped by extrusion, molding, calendering, thermoforming, or other means of shaping into any plastic article usable in an interior or confined space where fire can cause personal injury or property damage. The compounds resist melting and dripping.

Literally any plastic article useful in a human-occupied space such as a building, a vehicle, or a tunnel can benefit from the flame retardancy of this polycarbonate compound.

Because the physical properties of polycarbonate compounds are known, which are believed to not be deleteriously affected by the addition of the polyphosphazene, the talc, the PTFE, and optionally the sulfonic acid salt char former, any plastic article which is currently made from a polycarbonate compound can now be made from the non-halogenated flame retardant compound of this invention.

Polycarbonate itself has superior flame retardant properties when compared to other polymer resins, such as polyolefins. The inherent flame retardant properties of polycarbonate assisted in achieving the UL 94 V-0 rating at very thin dimensions after the addition of the polyphosphazene, the talc, the PTFE, and optionally, the sulfonic acid salt char former.

By achieving a UL 94 V-0 rating at a thickness as thin as 0.4 mm, it is known that a plastic article having any larger thickness will also achieve a UL 94 V-0 rating.

Thermoplastic articles are sold into the following markets: appliance, building and construction, consumer, electrical and electronic, healthcare, industrial, packaging, textiles, transportation, and wire and cable. Compounds of this invention can be used in any of those markets regardless of thickness above 0.4 mm, 40% of the thickness of a United States dime ($0.10) coin.

As stated repeatedly, Underwriters' Laboratories Test No. UL 94 serves as the litmus test for flame retardant thermoplastic compounds. As seen in Table 2, the V-0 rating is distinguished from V-1 and V-2 ratings, which are not acceptable if one is seeking the best flame retardance rating.

TABLE 2

| Criteria Conditions | V-0 | V-1 | V-2 |
|---|---|---|---|
| Afterflame time for each individual specimen $t_1$ or $t_2$ | ≤10 s | ≤30 s | ≤30 s |
| Total afterflame time for any condition set ($t_1$ plus $t_2$ for the 5 specimens) | ≤50 s | ≤250 s | ≤250 s |
| Afterflame plus afterglow time for each individual specimen after the second flame application ($t_2 + t_3$) | ≤30 s | ≤60 s | ≤60 s |
| Afterflame or afterglow of any specimen up to the holding clamp | No | No | No |
| Cotton indicator ignited by flaming particles or drops | No | No | Yes |

Examples provide data for evaluation of the unpredictability of this invention.

Examples

Table 3 shows the ingredients chosen for Examples 1-4 and Comparative Examples A-G.

TABLE 3

| Ingredients | Details and Sources |
|---|---|
| Polycarbonate | Branched Polycarbonate pellets, Makrolon 1239, from Bayer |
| Pigment | 9019-BK-99 Carbon Black MB pellets, from PolyOne Shenzhen Color & Additive |
| Char Former Pellets | Perfluorobutane sulfonic acid, Potassium Salt pellets-- Char Former, Bayowet C4 MB (6% loading in PC) from Lanxess Deutschland GmbH CAS No.: 029420-49-3 |
| Char Former Powder | Neat Bayowet C4 powder from Lanxess Deutschland CAS No.: 029420-49-3 |
| Polyphosphazene | Polyphosphazene powder -- Flame Retardant SPB 100 from Otsuka |
| Talc | Talc: Ultra Talc 609 powder from Specialty Minerals |
| PTFE | Teflon™ PTFE 6C Drip Suppressant powder |
| Stabilizer | Irganox 1010 Stabilizer Package powder from BASF |
| Antioxidant | Ultranox 627A, antioxidant powder from Chemtura |

Table 4 shows the mixing conditions in a Coperion W&P ZSK25WLE (L/D=44) twin screw extruder with all raw materials in pellet form being pre-mixed and then fed at throat at Barrel 1 and with all raw materials in powder form being pre-mixed and side-fed at Barrel 5.

The extrudate was pelletized, while in a water bath, for later injection or compression molding.

TABLE 4

Extruder Conditions

| | A | B | 1 | C | D | E |
|---|---|---|---|---|---|---|
| Zone 1 (° C.) | 260 | 260 | 260 | 260 | 260 | 260 |
| Zone 2 (° C.) | 260 | 260 | 260 | 260 | 260 | 260 |
| Zone 3 (° C.) | 260 | 260 | 260 | 260 | 260 | 260 |
| Zone 4 (° C.) | 246 | 246 | 246 | 246 | 246 | 246 |
| Zone 5 (° C.) | 232 | 232 | 232 | 232 | 232 | 232 |
| Zone 6 (° C.) | 232 | 232 | 232 | 232 | 232 | 232 |
| Zone 7 (° C.) | 232 | 232 | 232 | 232 | 232 | 232 |
| Zone 8 (° C.) | 232 | 232 | 232 | 232 | 232 | 232 |
| Zone 9 (° C.) | 232 | 232 | 232 | 232 | 232 | 232 |
| Die Temp (° C.) | 232 | 232 | 232 | 232 | 232 | 232 |
| RPM/Side screw RPM | 400 | 400 | 400 | 400 | 400 | 400 |
| % Torque | 77-84 | 67-79 | 71-83 | 80-88 | 74-86 | 68-76 |
| Die Press (psi) | 329 | 290 | 288 | 303 | 316 | 284 |
| Melt Temp (° C.) | 242 | 238 | 239 | 241 | 243 | 242 |
| Melt Temp Pyro (° C.) | 285 | 288 | 284 | 262 | 274 | 281 |
| Feeder Rate #_1_S/M (lbs./hr.) | 44.65 | 42.4 | 42.15 | 44.9 | 44.65 | 42.4 |
| Feeder Rate #_2_S/M (lbs./hr.) | 5.35 | 7.6 | 7.85 | 5.1 | 5.35 | 7.6 |
| Total Rate | 50 | 50 | 50 | 50 | 50 | 50 |
| Vacuum/Inches | 22 | 21 | 22 | 21 | 21 | 21 |

| | F | 2 | 3 | 4 | G |
|---|---|---|---|---|---|
| Zone 1 (° C.) | 260 | 260 | 260 | 260 | 293 |
| Zone 2 (° C.) | 260 | 260 | 260 | 260 | 293 |
| Zone 3 (° C.) | 260 | 260 | 260 | 260 | 288 |
| Zone 4 (° C.) | 246 | 246 | 246 | 246 | 288 |
| Zone 5 (° C.) | 232 | 232 | 232 | 232 | 288 |
| Zone 6 (° C.) | 232 | 232 | 232 | 232 | 282 |
| Zone 7 (° C.) | 232 | 232 | 232 | 232 | 282 |
| Zone 8 (° C.) | 232 | 232 | 232 | 232 | 277 |
| Zone 9 (° C.) | 232 | 232 | 232 | 232 | 277 |
| Die Temp (° C.) | 232 | 232 | 232 | 232 | 271 |
| RPM/Side screw RPM | 400 | 400 | 400 | 400 | 400 |
| % Torque | 62-75 | 72-83 | 77-84 | 78-87 | 72-85 |
| Die Press (psi) | 303 | 326 | 307 | 320 | 274 |
| Melt Temp (° C.) | 242 | 242 | 246 | 254 | 284 |
| Melt Temp Pyro (° C.) | 272 | 267 | N/A | N/A | 296 |
| Feeder Rate #_1_S/M (lbs./hr.) | 44.9 | 42.12 | 42.15 | 44.65 | 45.15 |
| Feeder Rate #_2_S/M (lbs./hr.) | 5.1 | 7.88 | 7.85 | 5.35 | 4.85 |
| Total Rate | 50 | 50 | 50 | 50 | 50 |
| Vacuum/Inches | 21 | 22 | 21 | 21 | 20 |

The extrudate was pelletized for later molding.

Before molding, the pellets were dried for more than 8 hours at 90° C. to reduce moisture content to less than 0.02%.

Using a DeMag molding machine, Table 5 shows the settings used to mold test bars of each Example and Comparative Example having a thickness of 0.75 mm.

TABLE 5

Injection Molding Conditions

| Temperatures: | |
| --- | --- |
| Nozzle (° C.) | 277 |
| Zone 2 (° C.) | 282 |
| Zone 3 (° C.) | 277 |
| Zone 4 (° C.) | 271 |
| Mold (° C.) | 88 |
| Oil Temp (° C.) | 41 |
| Speeds: | |
| Screw RPM | 80 |
| % Shot - Inj Vel (in/sec) | 100%-1.0 |
| Pressures: | |
| Injection Pressure (psi) | 1247 |
| Hold Pressure (psi) | 1000-5 sec/600-3 sec |
| Back Pressure (psi) | 75 |
| Timers: | |
| Injection Hold (sec) | 8 |
| Cure/Cool Time (sec) | 20 |
| Fill Time (sec) | 1.48 |
| Cycle Time (sec) | 36.26 |
| Operation Settings: | |
| Shot Size (in) | 1 |
| Cushion (in) | 0.23 |
| Cut-off Position (in) | 0.25 |
| Decompression (in) | 0.2 |

Samples of all Examples and Comparative Examples were also subjected to compression molding. About 25 to 30 g of the material was placed between two Teflon™ coated trays, inserted into a PHI 40000 ton manual hydraulic press (model: P2150) preheated at 213° C. (415° F.), then started slowly increasing pressure to $2.72 \times 10^7$ kg (30,000 tons) over 3~5 minutes. After that, remove the plates from the press and cooled for 3~5 minutes to take out film with a thickness of about 0.4~0.5 mm. From those films, an Arbor fitted with a flexural die cut a flame bar sample shape out of the film for UL 94 testing.

Table 6 shows the physical properties tested, two samples for each Example and Comparative Example.

TABLE 6

Physical Properties

| Ingredients | Comp. A | Comp. B | 1 | Comp. C | Comp. D | Comp. E |
| --- | --- | --- | --- | --- | --- | --- |
| | | | Formulation in Wt. % | | | |
| Polycarbonate | 88.2 | 83.7 | 83.3 | 88.7 | 88.3 | 83.8 |
| Pigment | 1 | 1 | 1 | 1 | 1 | 1 |
| Char Former Pellets | 0.1* | 0.1* | 0 | 0.1* | 0 | 0 |
| Char Former Powder | 0 | 0 | 0 | 0 | 0 | 0 |
| Polyphosphazene | 10 | 10 | 10 | 10 | 10 | 10 |
| Talc | 0 | 5 | 5 | 0 | 0 | 5 |
| PTFE | 0.5 | 0 | 0.5 | 0 | 0.5 | 0 |
| Stabilizer | 0.1 | 0.1 | 0.1 | 0.1 | 0.1 | 0.1 |
| Antioxidant | 0.1 | 0.1 | 0.1 | 0.1 | 0.1 | 0.1 |
| Total | 100 | 100 | 100 | 100 | 100 | 100 |
| Thickness of Sample | UL Flammability Rating (UL 94 Test harmonized with ISO 9772/9773) | | | | | |
| 0.75 mm | V-1 | V-2 | V-0 | V-2 | V-1 | V-2 |
| | ($t_1 + t_2$ = 42 s) | ($t_1 + t_2$ = 30 s) | ($t_1 + t_2$ = 20 s) | ($t_1 + t_2$ = 46 s) | ($t_1 + t_2$ = 70 s) | ($t_1 + t_2$ = 23 s) |
| 0.4-0.5 mm | V-2 | V-2 | V-0 | V-2 | V-2 | V-2 |
| | ($t_1 + t_2$ = 55 s) | ($t_1 + t_2$ = 34 s) | ($t_1 + t_2$ = 26 s) | ($t_1 + t_2$ = 25 s) | ($t_1 + t_2$ = 29 s) | ($t_1 + t_2$ = 20 s) |

| Ingredients | Comp. F | 2 | 3 | 4 | Comp. G |
| --- | --- | --- | --- | --- | --- |
| Polycarbonate | 88.8 | 83.24 | 83.2 | 88.2 | 89.2 |
| Pigment | 1 | 1 | 1 | 1 | 1 |
| Char Former Pellets | 0 | 0 | 0.1* | 0.1* | 0.1* |
| Char Former Powder | 0 | 0.06** | 0 | 0 | 0 |
| Polyphosphazene | 10 | 10 | 10 | 5 | 4 |
| Talc | 0 | 5 | 5 | 5 | 5 |
| PTFE | 0 | 0.5 | 0.5 | 0.5 | 0.5 |
| Stabilizer | 0.1 | 0.1 | 0.1 | 0.1 | 0.1 |
| Antioxidant | 0.1 | 0.1 | 0.1 | 0.1 | 0.1 |
| Total | 100 | 100 | 100 | 100 | 100 |
| Thickness of Sample | UL Flammability Rating (UL Test harmonized with ISO 9772/9773) | | | | |
| 0.75 mm | V-2 | V-0 | V-0 | V-0 | V-2 |
| | ($t_1 + t_2$ = 32 s) | ($t_1 + t_2$ = 22 s) | ($t_1 + t_2$ = 19 s) | ($t_1 + t_2$ = 23 s) | ($t_1 + t_2$ = 52 s) |
| 0.4-0.5 mm | V-2 | V-2 | V-0 | V-1 | None rating |
| | ($t_1 + t_2$ = 2 s) | ($t_1 + t_2$ = 33 s) | ($t_1 + t_2$ = 23 s) | ($t_1 + t_2$ = 44 s) | |

*Computes to 0.006 wt. % of potassium salt of perfluorobutane sulfonic acid (CAS No. 029420-49-3) in the compound.
**10 times the amount of potassium salt of perfluorobutane sulfonic acid as in Examples 3 and 4

To the required ingredients of polycarbonate and polyphosphazene, three functional additives were evaluated, in all of the various combinations because of the unpredictability of achieving a UL 94 V-0 test rating: polytetrafluoroethylene (PTFE) drip suppressant, talc mineral filler which serves as a viscosity enhancer and an oxygen barrier during combustion, and a char former of the potassium salt of perfluorobutane sulfonic acid.

Comparative Examples A-F demonstrate that, in order to achieve a UL 94 V-0 rating for either the 0.75 thickness (injection molded article) or the 0.4-0.5 thickness (compression molded article) of the compound that both PTFE and talc are required, but not the sulfonic acid salt char former. It was unexpected that no sulfonic acid salt char former would be needed. More specifically, Example 1 showed that only PTFE and talc need be added to polycarbonate and polyphosphazene in order to achieve the coveted UL 94 V-0 rating for both thicknesses tested.

Examples 2, 3, and 4 introduce that the presence of the sulfonic acid salt char former. Example 2 contains 10 times the amount of sulfonic acid salt as that found in Examples 3 or 4 (or as found in Comparative Examples A-C) which adversely affected flame retardance in the 0.4-0.5 mm thickness testing, demonstrating that there can be too much char former to achieve a UL 94 V-0 rating at the 0.4-0.5 mm thickness. Likewise, Example 4 contained half the amount of polyphosphazene as did Example 3, demonstrating that there can be too little polyphosphazene to achieve a UL 94 V-0 rating at the 0.4-0.5 mm thickness, all other factors being equal. Examples 2-4 perform acceptably when testing at least one thickness, as compared with Comparative Examples A-C, because both talc and PTFE are present in each of Examples 2-4.

Examples 3 and 4 were also tested for physical properties and had a heat deflection temperature (HDT) of 114° C. and 128° C., respectively, as tested according to ASTM D-648 at 66 psi. Therefore, there is a correlation between an increase in HDT and a decrease in the amount of polyphosphazene.

Examples 2-4 show that a compound with sulfonic acid salt char former, PTFE, and talc achieved a UL 94 V-0 rating for the 0.75 thickness (injection molded article) but not the 0.4-0.5 thickness (compression molded article), unless the amount of polyphosphazene was more than 5 weight percent and the amount of the potassium salt of perfluorobutane sulfonic acid was less than 0.06 weight percent. Moreover, with the presence of all three functional additives, a drop in the polyphosphazene from 10 weight percent to 5 weight percent to 4 weight percent caused a loss of UL 94 V-0 rating from 5 weight percent to 4 weight percent, as seen in the trend from Example 3, to Example 4, to Comparative Example G. In one respect, the change from 5 weight percent to 4 weight percent (Example 4 to Comparative Example G) could be viewed as only one weight percent difference of the total compound. But in another, more important respect, the change from 5 weight percent to 4 weight percent was a decrease of 20% of the amount of polyphosphazene in the compound. The dividing line between Example 4 and Comparative Example G was more pronounced than first appreciated.

Thus, the drop in flame retardance performance from Example 4 to Comparative Example G was particularly surprising and demonstrated how minor variations in the total compound can cause major differences in performance results, another indication of the unpredictability of the present invention to a person having ordinary skill in the art. Nonetheless, with Examples 1-4 and Comparative Examples A-G, without undue experimentation after reviewing these Examples, that person could tailor other formulations within the ranges identified in Table 1 to produce other embodiments of the invention.

Example 3 was also tested for its physical properties. Table 7 shows the results.

TABLE 7

| Property | Test Method* | Result |
|---|---|---|
| Specific Gravity | D-792 | 1.249 |
| Melt Mass Flow Rate (250° C./2.16 kg) | D1238 | 2.07 g/10 min. |
| Tensile Strength, yield** | D-638 | 9,170 psi |
| Tensile Elongation, break** | D-638 | 60–80% |
| Flexural Strength | D-790 | 15,120 psi |
| Flexural Modulus | D-790 | 413,000 psi |
| Limiting Oxygen Index | D-2863 | 46.8% $O_2$ |
| Glow Wire Ignition Temp. (1/8") | IEC 60695-2-13 | 900° C. |
| Glow Wire Flammability Index (1/8") | IEC 60695-2-12 | 960° C. |
| Linear Mold Shrinkage (direction of flow) | D-955 | 0.005 in/in |
| Linear Mold Shrinkage (transverse to flow) | D-955 | 0.011 in/in |

*ASTM unless otherwise indicated
**2 inches/min.

Table 7 showed that Example 3 can yield an excellent compound for molding, extruding, calendering, thermoforming, or other shaping process to form marketable plastic articles.

The invention is not limited to the above embodiments. The claims follow.

What is claimed is:

1. A flame retardant polycarbonate compound, consisting of:
   (a) polycarbonate,
   (b) polyphosphazene,
   (c) talc,
   (d) polytetrafluoroethylene,
   (e) optionally, potassium salt of perfluorobutane sulfonic acid, and
   (f) optionally, one or more additives selected from the group consisting of anti-oxidants, pigments, and combinations of them,
   wherein the polyphosphazene is present in the compound at a weight percent from 5 to about 15,
   and wherein the compound tested at a thickness of 0.75 mm and a thickness of 0.4-0.5 mm has a UL 94 rating of V-0.

2. The compound of claim 1, wherein the polycarbonate is a branched polycarbonate of virginal source, recycled source, or both.

3. The compound of claim 1, wherein the compound has ingredients in amounts expressed in weight percent:

| | |
|---|---|
| Polycarbonate | 80-90 |
| Polyphosphazene | 5-15 |
| Talc | 2-9 |
| Polytetrafluoroethylene | 0.1-0.8 |
| Optional Potassium salt of perfluorobutane sulfonic acid | 0-0.2 |
| Optional Additives | 0-5. |

4. The compound of claim 1, wherein the compound has ingredients in amounts expressed in weight percent:

| | |
|---|---|
| Polycarbonate | 80-90 |
| Polyphosphazene | 5-10 |
| Talc | 3-8 |
| Polytetrafluoroethylene | 0.3-0.7 |
| Optional Potassium salt of perfluorobutane sulfonic acid | 0-0.1 |
| Optional Additives | 0-3. |

5. The compound of claim 1, wherein the compound has ingredients in amounts expressed in weight percent:

| | |
|---|---|
| Polycarbonate | 80-85 |
| Polyphosphazene | 7-10 |
| Talc | 4-6 |
| Polytetrafluoroethylene | 0.4-0.6 |
| Optional Potassium salt of perfluorobutane sulfonic acid | 0-0.01 |
| Optional Additives | 0-2. |

6. A molded article made from the compound of claim 1.

7. An extruded article made from the compound of claim 1.

8. A calendered article made from the compound of claim 1.

9. A thermoformed article made from the compound of claim 1.

10. A method of using the compound of claim 1, comprising the step of shaping the compound into an article designed to resist combustion or molten dripping in the presence of flame.

11. The method of claim 10, wherein the polycarbonate of the compound is a branched polycarbonate of virginal source, recycled source, or both.

12. The method of claim 10, wherein the shaping comprises extruding, molding, calendering, or thermoforming.

13. A flame retardant polycarbonate compound, consisting of:
   (a) polycarbonate,
   (b) polyphosphazene,
   (c) talc,
   (d) polytetrafluoroethylene, and
   (e) optionally, potassium salt of perfluorobutane sulfonic acid,
   wherein the polyphosphazene is present in the compound at a weight percent from 5 to about 15,
   and wherein the compound tested at a thickness of 0.75 mm and a thickness of 0.4-0.5 mm has a UL 94 rating of V-0.

* * * * *